United States Patent [19]

Blanpain et al.

[11] 4,231,672
[45] Nov. 4, 1980

[54] HEAVY DUTY ADJUSTABLE PROP WITH A BALL-AND-SOCKET JOINT

[75] Inventors: Guy Blanpain, Verneuil.En.Halatte; Pierre Grandfils, Precy-sur-Oise, both of France

[73] Assignee: Charbonnages de France, Paris, France

[21] Appl. No.: 52,013

[22] Filed: Jun. 25, 1979

[30] Foreign Application Priority Data

Jun. 29, 1978 [FR] France .................... 78 19460

[51] Int. Cl.³ .................................. F16C 11/00
[52] U.S. Cl. .................................... 403/62
[58] Field of Search ............ 403/26, 62, 123, 124, 403/125, 131, 109; 248/180, 357; 308/72

[56] References Cited

U.S. PATENT DOCUMENTS

| | | | |
|---|---|---|---|
| 3,149,855 | 9/1964 | Adloff et al. | 403/125 X |
| 3,168,014 | 2/1965 | Aslan | 248/357 X |
| 3,171,627 | 3/1965 | Tapley et al. | 248/357 X |
| 3,263,445 | 8/1966 | Dunn | 308/72 X |
| 3,414,302 | 12/1968 | Priest | 403/125 |
| 3,561,800 | 2/1971 | Hassan | 308/72 X |
| 3,782,673 | 1/1974 | Wehrens | 248/357 |

Primary Examiner—Wayne L. Shedd
Attorney, Agent, or Firm—Cushman, Darby & Cushman

[57] ABSTRACT

A ball joint for transmitting forces between the prop and the head-piece of a support unit has a spherical head received in the spherical internal surface of a dome. The dome is enclosed by a spherical ring which is fastened to the head. The rod of a prop carries a pivot which is mounted with radial clearance in a cylindrical cavity located within the sphericl head.

9 Claims, 3 Drawing Figures

HEAVY DUTY ADJUSTABLE PROP WITH A BALL-AND-SOCKET JOINT

BACKGROUND OF THE INVENTION

The present invention relates to a ball joint for a prop unit and to a prop unit provided with this joint.

U.S. Pat. Nos. 3,414,302 and 3,101,961, French Patent Specifications Nos. 2,042,262, 901,628 and 1,458,003 and German Patent Specifications Nos. 2,015,368 and 506,246 all describe ball joints in which a skirt having spherical and concentric external and internal support surfaces is one of the elements of a ball joint whilst the other element is a central spherical head fastened to an outer annular element having spherical convexity. These Patent Specifications, and more particularly U.S. Pat. No. 3,414,302, show these known joints connecting parts which are not in alignment, such as those which are required in steering linkages for automobile vehicles or for obliquely transmitting a force applied by the rod of a jack.

In all these known devices the possibility of inclination is limited as the edge of the skirt bears against the spherical head. Accordingly, if such devices were used in a support unit liable to bear heavy loads, of the order of tens of tonnes, the following disadvantage would exist: when the load was an oblique thrust the edge of the skirt or of the annular element would support a considerable proportion of the load, with the risk of deformation or jamming.

This disadvantage is likewise not avoided by the device described in German Patent No. 1,122,914.

In the ball joints applied to props which are described in U.S. Pat. No. 3,481,573 and French Patent No. 1,226,776, these patents do not avoid the disadvantages of thrusts very close to the articulation centre, that is to say supporting impermissible forces when the load is oblique.

It is an object of the present invention to provide improvements making it possible for ball joints to be used with props of support units whilst avoiding thrust support pressures which are impermissible for the metal and whilst increasing the angle of articulation.

As has already been proposed in the patents mentioned above, it is possible to use joints having two degrees of angular freedom, of the cardan joint type, but joints of this kind entail difficulties of alignment when a plurality of joints are required, as is often the case with the head-pieces of support units. Furthermore, joints based on the cardan principle are very bulky.

SUMMARY

According to the present invention there is provided a ball joint for transmitting supporting and tractive forces between a prop and a head-piece of a support unit, the ball joint comprising a support element arranged to be carried by a prop and having a spherical head, and a cooperating element arranged to be fastened to a head-piece, the cooperating element being in the form of a skirt-shaped dome and having an internal spherical concave surface extending over a hemisphere at maximum and an external spherical convex surface concentric to said internal surface, the internal surface of the dome having a shape which corresponds to that of the head and cooperating with said head, the support element having a support surface spaced from the head and having a spherical shape corresponding to that of the head, said dome being received in the space between the support surface and the head and the support surface surrounding and bearing against the external surface of the dome, wherein the support element has a cylindrical cavity located within the spherical head and a pivot is mounted with radial clearance within the cylindrical cavity, the pivot being arranged to be carried by the prop.

Preferably, the bottom of the cavity contains a disc having a spherical or cylindrical bearing surface for the pivot, and the end of the pivot is shaped accordingly.

In an embodiment, the pivot is locked against axial rotation in the cavity, for example by being mounted in the cavity by means of a trunnion joint whose axis is transverse with respect to the axis of the pivot.

In an embodiment the element carrying the spherical head is extended by a sleeve which surrounds the prop and is preferably telescopic.

The invention also extends to a prop unit comprising a prop having a body and a rod slidably received within the body, and a ball joint arranged to transmit supporting and tractive forces between the prop and a head-piece of a support unit, wherein the ball joint comprises a support element carried by the prop and having a spherical head, and a cooperating element arranged to be fastened to a head-piece, the cooperating element being in the form of a skirt-shaped dome and having an internal spherical concave surface extending over a hemisphere at maximum and an external spherical convex surface concentric to said internal surface, the internal surface of the dome having a shape which corresponds to that of the head and cooperating with said head, the support element having a support surface spaced from the head and having a spherical shape corresponding to that of the head, said dome being received in the space between the support surface and the head and the support surface surrounding and bearing against the external surface of the dome, and wherein the support element has a cylindrical cavity located within the spherical head and the rod of the prop carries a pivot which is mounted with radial clearance within the cylindrical cavity.

Preferably, the foot of the body of the prop is connected to a part fastened to the sole-piece or group of sole-pieces of a support unit, the connecting being made by way of one or more connecting rods each articulated to said part and to the foot by means of respective pivot joints whose axes are parallel to the axis of the trunnion.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
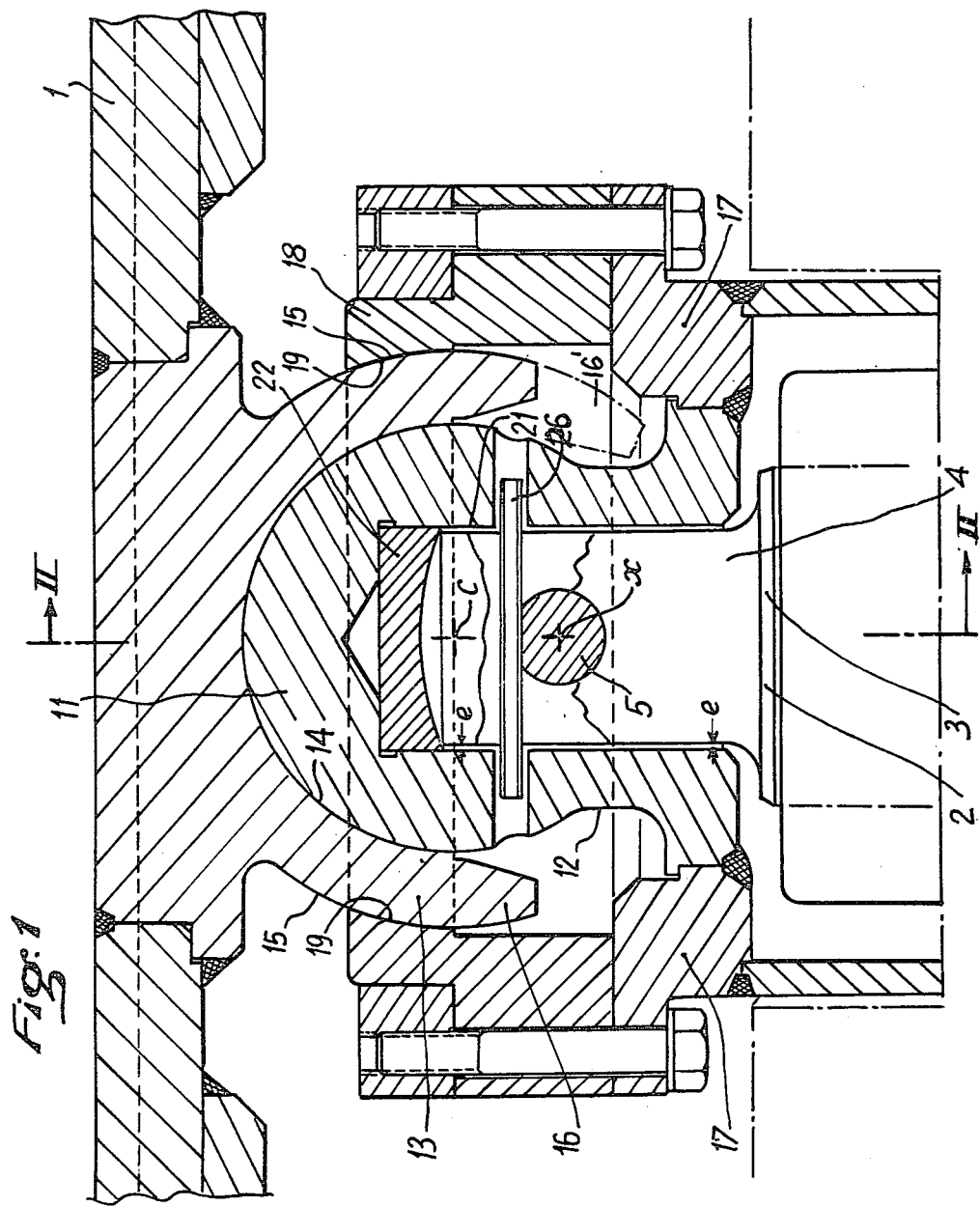
FIG. 1 is a section of a joint of the invention taken along line I—I of FIG. 2 and showing a vertical longitudinal section of part of a support head-piece and a section of part of a prop through the axis of the prop.
Figure 2:
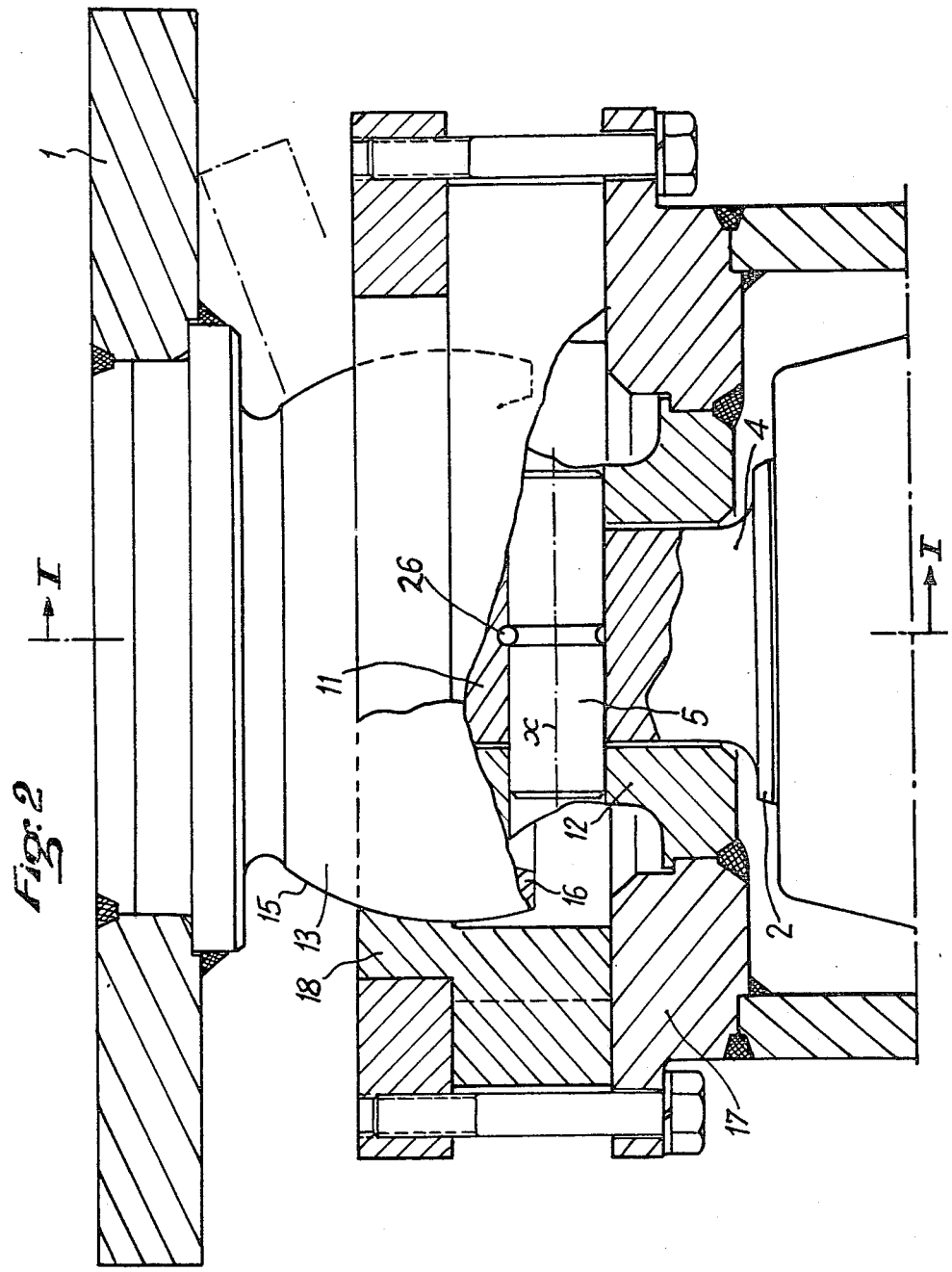
FIG. 2 is a view taken partly in section on the line II—II of FIG. 1 showing the section transverse to that of FIG. 1.

The joint shown in the drawings serves for connecting a part 1 to the post 2 of a prop 3.

The joint comprises a spherical head 11 having a base 12 of thick section fixed to the post 2, as will be described below, and a dome 13 having a spherical concavity which extends over a hemisphere and no further, the shape of the spherical concavity corresponding to that of the spherical head 11. The dome 13 is fastened to the head-piece by the part 1, which is a component part of the head-piece or is a part joined to the latter or to two head-pieces. The dome 13 has its concave face 14 directed downwards. This dome 13 is shaped like a skirt, whose outer surface 15 has in addition a spherical convexity concentric to the concave face 14 except in the upper portion fastened to the part 1. Beyond its concave hemispherical face 14 the dome 13 is extended by a collar 16 whose inner face is at a clear distance from the spherical surface of the head 11, but whose outer face extends as a spherical ring forming an exact spherical continuation of the outer surface 15. At 16' a broken line shows the extreme position in spherical rotation of the collar 16 in the event of the inclination of the head-piece in relation to the prop 3.

Supports 17 are fastened onto the base 12 of the head 11 at a clear distance from the head 11. A ring 18 is rigidly fixed to the supports 17 and has an internal concave support surface 19 which corresponds in shape to that of the outer surface 15 of the dome 13. The support surface 19 surmounts the outer surface 15 in the zone radially extending the hemisphere by which the dome bears on the corresponding support hemisphere of the spherical head 11.

It can be seen that any stress, in whatever direction and in whatever sense it is directed, will always result in a support reaction on a large surface, because the dome 13 can only be displaced by spherical sliding between the head 11 and the spherical ring 18 and these are firmly fastened to one another. Any reaction will therefore be either a reaction of support of the dome 13 on the head 11, or a reaction of support of the ring 18 on the dome 13. It can also be seen that the assembly of the joint is simple, the ring 18 being composed of two parts joined, in a joint plane of the plane of FIG. 1, to the support 17 after the dome 13 and the head 11 have been brought into contact.

As the result of this arrangement it is possible, for equal dimensions, to multiply by a considerable factor the load which can be supported by the joint. It has thus been found possible to construct a head-piece/prop joint for a support subjected to clamping at 90 tonnes per prop and bearing a sliding load of 110 tonnes per prop.

The joint as described so far is in turn coupled to the prop 3 by the post 2 of the said prop, as will now be explained.

Figure 3:
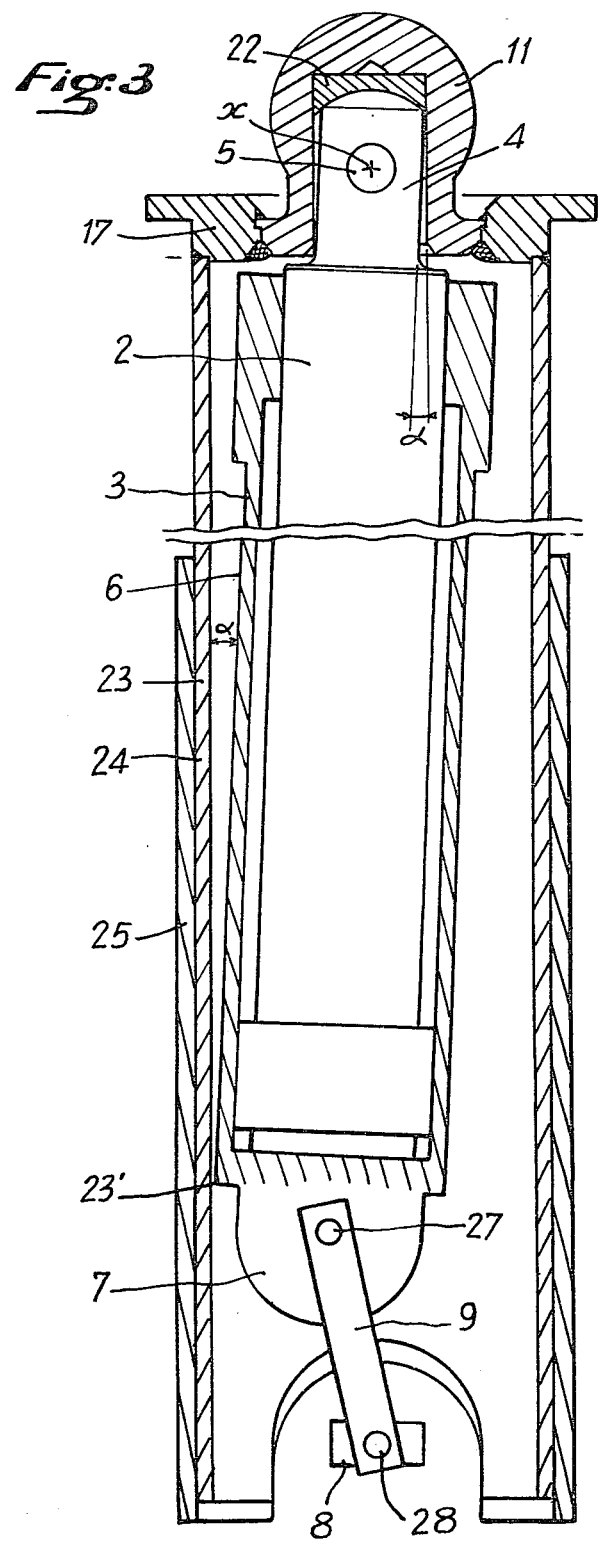
FIG. 3 shows, on a smaller scale, a section similar to that of FIG. 1, showing a prop equipped with a part of a joint of the invention before connection to another joint part which is fastened to the head-piece.

The spherical head 11 has a blind cylindrical cavity 21 passing axially through the base 12 of the said head 11. The rod 2 of the prop 3 carries at its upper end a pivot 4 whose diameter is substantially smaller than that of the cylindrical cavity 21, so that a clearance e remains in the centred position. The connection between the spherical head 11 and the pivot 4 is made by means of a transverse trunnion 5 which is offset downwards in relation to the centre of rotation c of the ball joint. The trunnion 5 is fastened by means of a pin 26 extending transversely of the pivot 4 and of the trunnion 5. The bottom of the blind cavity 21 contains a disc 22 having a concave spherical or cylindrical bearing surface centred on the axis x of the trunnion 5. The concave spherical or cylindrical bearing surface of the disc 22 receives the end of the pivot 4 which has a corresponding spherical or cylindrical shape. It can be seen that as the result of the arrangement described the rod 2 of the prop 3 is coupled to the joint head 11 by another joint pivoting about the trunnion 5 and that because of the clearance e an angle of delfection $\alpha$ (FIG. 3) is permitted between the prop 3 and the head 11.

Furthermore, the foot 7 of the body 6 of the prop 3 is connected to a part 8 fixed to the sole-piece or group of sole-pieces of the support unit by way of one or more connecting rods 9 articulated both on the part 8 and on the foot 7 by pivot joints 27 and 28 respectively. The axes of the pivot joints 27 and 28 are parallel to the axis x of the trunnion 5. The part 8 may, for example, be the bottom support member of the jack or prop of one of the support units described in U.S. Patent Applications Ser. Nos. 762,798 and 808,548.

In order that the deflection of the prop 3 in relation to the head 11 may be limited without initiating inacceptable stresses at the inlet of the cavity 21, a rectangular sleeve 23 is provided which extends downwards from the support member 17 on which it is fastened. This sleeve 23 limits at 23' the deflection of the body 6 of the prop 3 to the angle $\alpha$. The sleeve 23 is telescopic so that its length is always adapted to the length of the prop which is extended to a greater or lesser extent. It is therefore composed of two casings 24 and 25, of which one 24 is fixed on the support 17, as already explained, while the other 25 is connected directly or indirectly to the sole-piece or sole-pieces of the support unit.

We claim:

1. A ball joint for transmitting supporting and tractive forces between a prop and a head-piece of a support unit, the ball joint comprising a support element arranged to be carried by a prop and having a spherical head, and a cooperating element arranged to be fastened to a head-piece, the cooperating element being in the form of a skirt-shaped dome and having an internal spherical concave surface extending over a hemisphere at maximum and an external spherical convex surface concentric to said internal surface, the internal surface of the dome having a shape which corresponds to that of the head and cooperating with said head, the support element having a support surface spaced from the head and having a spherical shape corresponding to that of the head, said dome being received in the space between the support surface and the head and the support surface surrounding and bearing against the external surface of the dome, wherein the support element has a cylindrical cavity located within the spherical head and a pivot is mounted with radial clearance within the cylindrical cavity, the pivot being arranged to be carried by the prop.

2. A ball joint according to claim 1, wherein the bottom of the cylindrical cavity contains a disc having a spherical or cylindrical bearing surface for the pivot and that the end of the pivot has a shape which corresponds to that of said bearing surface.

3. A ball joint according to claim 1, wherein the pivot is locked against axial rotation in the cavity.

4. A ball joint according to claim 3, wherein the pivot is mounted in the cavity by a trunnion joint whose axis is transverse to the axis of the pivot.

5. A ball joint according to claim 1, wherein the support element further includes a sleeve extending away from the spherical head, said sleeve being arranged to enclose the prop.

6. A ball joint according to claim 5, wherein said sleeve is telescopic.

7. A prop unit comprising a prop having a body and a rod slidably received within the body, and a ball joint arranged to transmit supporting and tractive forces between the prop and a head-piece of a support unit, wherein the ball joint comprises a support element carried by the prop and having a spherical head, and a cooperating element arranged to be fastened to a head-piece, the cooperating element being in the form of a skirt-shaped dome and having an internal spherical concave surface extending over a hemisphere at maximum and an external spherical convex surface concentric to said internal surface, the internal surface of the dome having a shape which corresponds to that of the head and cooperating with said head, the support element having a support surface spaced from the head and having a spherical shape corresponding to that of the head, said dome being received in the space between the support surface and the head and the support surface surrounding and bearing against the external surface of the dome, and wherein the support element has a cylindrical cavity located within the spherical head and the rod of the prop carries a pivot which is mounted with radial clearance within the cylindrical cavity.

8. A prop unit according to claim 7, wherein the pivot is mounted in the cavity by a trunnion joint whose axis is transverse to the axis of the pivot.

9. A prop unit according to claim 8, wherein the body of the prop has a foot which is connected to a part arranged to be fixed to at least one sole-piece of a support unit, the foot and said part being connected by way of at least one connecting rod which is connected to said foot by way of a first pivot joint and to said part by way of a second pivot joint, the axes of said first and second pivot joints extending parallel to the axis of said trunnion joint.

* * * * *